Feb. 24, 1953      P. S. DICKEY      2,629,552
CONTROL SYSTEM

Filed Oct. 26, 1949      4 Sheets-Sheet 1

INVENTOR.
PAUL S. DICKEY
BY
Raymond W. Jenkins
ATTORNEY

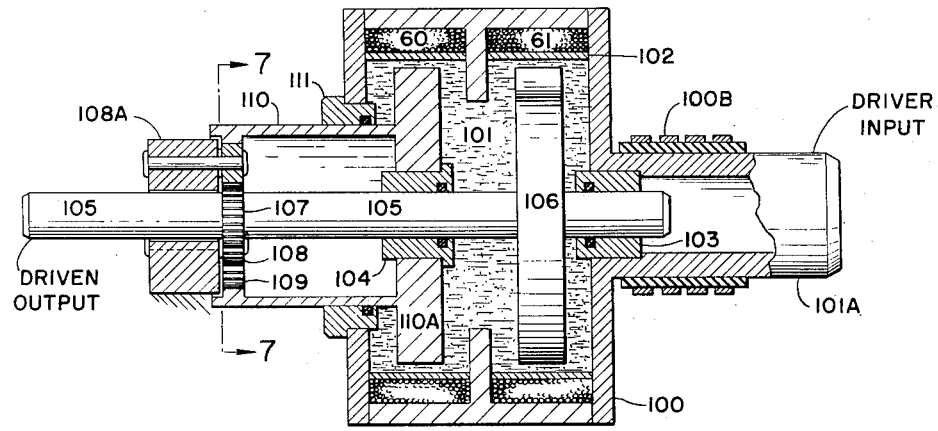
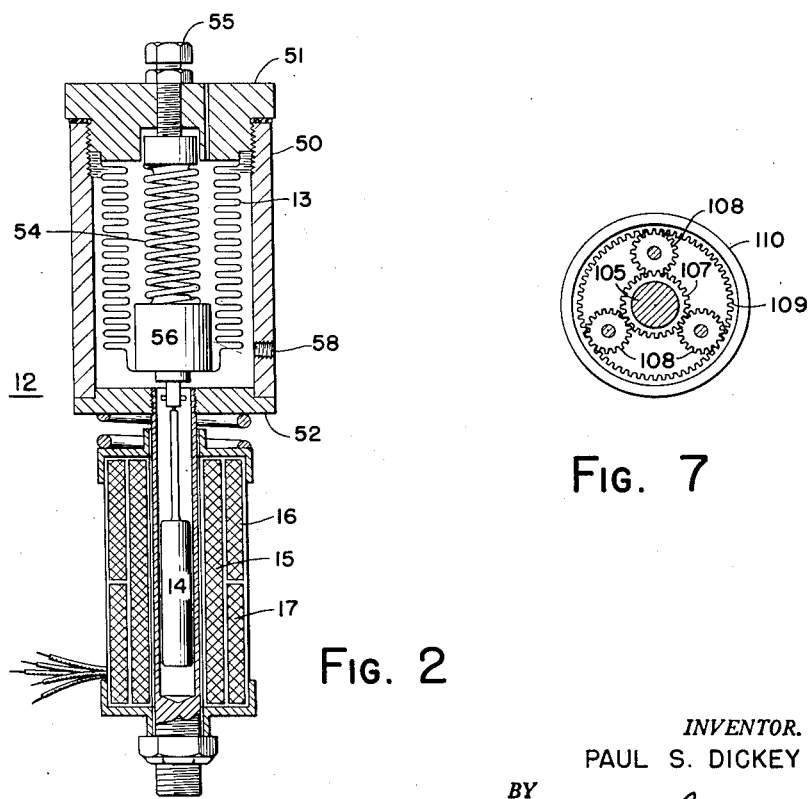

Feb. 24, 1953         P. S. DICKEY         2,629,552
                     CONTROL SYSTEM
Filed Oct. 26, 1949                    4 Sheets-Sheet 3

INVENTOR.
PAUL S. DICKEY
BY
Raymond W. Jenkins
ATTORNEY

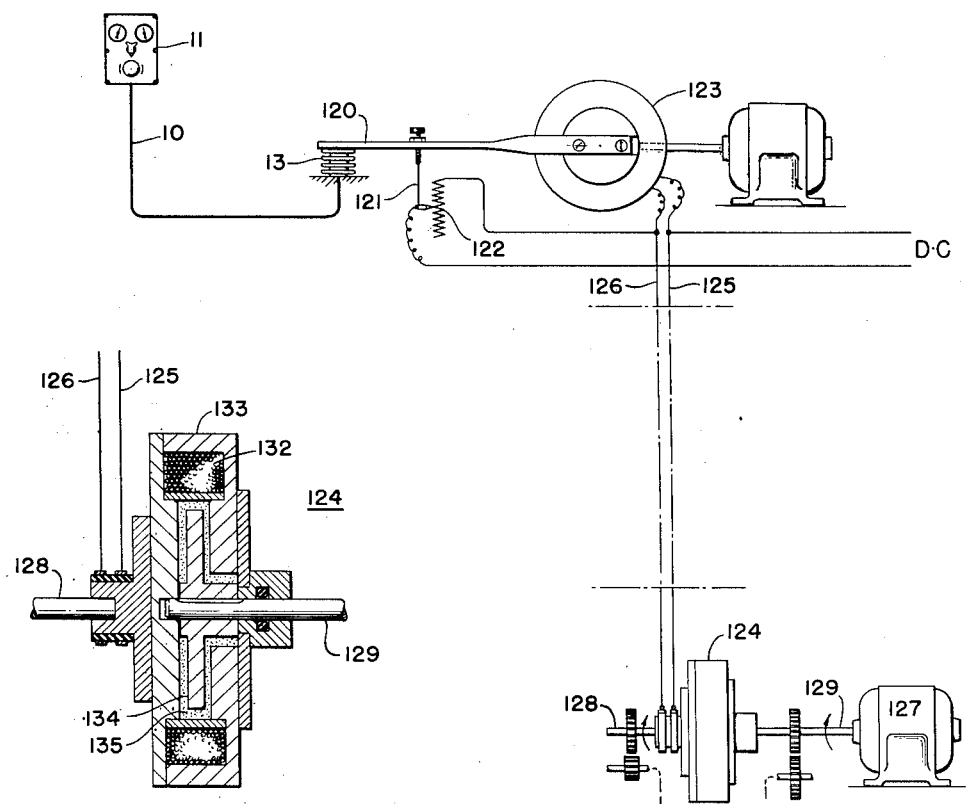
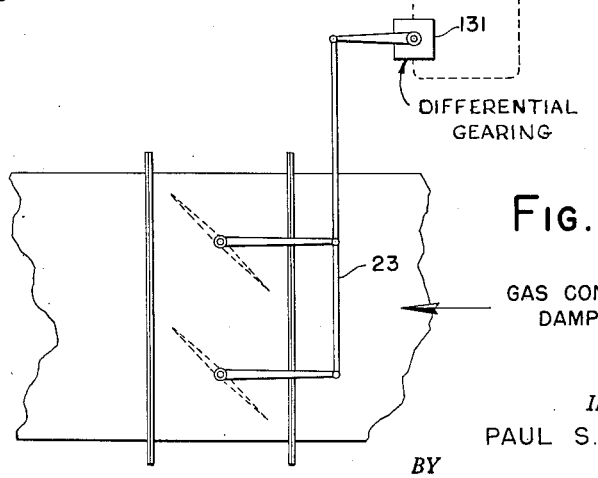
FIG. 9.
FIG. 8
GAS CONTROL DAMPER
INVENTOR.
PAUL S. DICKEY

Patented Feb. 24, 1953

2,629,552

UNITED STATES PATENT OFFICE 2,629,552

CONTROL SYSTEM

Paul S. Dickey, East Cleveland, Ohio, assignor to Bailey Meter Company, a corporation of Delaware Application October 26, 1949, Serial No. 123,776

13 Claims. (Cl. 236—23)

My present invention relates to control systems and particularly to the control of variable conditions, positions, or the like where a considerable distance separates the instrument sensing the value of the variable from a power operator which regulates an agent affecting the variable.

It is frequently desirable or necessary that the measuring or sensing instrument be located as near as possible to the point of measurement while the power regulator may, of necessity, be located at the damper, valve or other control device.

In oil refineries and similar hazardous locations it is preferable that the measuring or controlling instruments be of the fluid pressure type rather than having the explosive possibilities of electric devices. However, electrical telemetering is the simplest form of long distant transmission of control signals. Likewise the damper, valve or similar regulating device may be best adapted to operation through the agency of electric motors.

It is also frequently desirable to interconnect existing fluid pressure systems with contemplated or previously installed electric power operators.

It is thus the principal object of my invention to provide a control system wherein the measuring and/or dictating equipment is of the fluid pressure type while the telemetering link and receiving power operator are electrical in nature.

More particularly the power operator may be a constant speed unidirectional electric motor connected to the damper or similar device through the agency of a magnetic fluid slip clutch or coupling under the control of the fluid pressure transmitter.

A variable condition such as level, temperature, flow, or some combination of such variables may be represented by fluid pressure values. The fluid pressure values may be transduced into corresponding electric values whose magnitude and phase is representative of, or proportional to, the magnitude and sense of the value of the variable or of a change in the value of the variable from a predetermined or desired value. The invention has particular application in systems of power plant control where it is desired that the fluid pressure signals of a control system be transmitted over a comparatively great distance for control of a coupling means between a constant speed unidirectional power source and a device such as a damper to be positioned for controlling the application of an agent to vary or maintain the value of the variable condition. In applications of this nature both the desired speed of signal transmittal as well as the character of the signal required for magnetic fluid clutches dictates a change of the fluid pressure signal into corresponding electrical effects.

A further object is the control of a magnetic fluid coupling by means of fluid pressure values established at a remote location and electrically telemetered to the point of control.

I have chosen to particularly illustrate and describe my invention in connection with the control of a gas control damper in accordance with boiler loading and steam temperature for maintaining the steam temperature at a predetermined value or values for different boiler loading. While this particular example is rather specific to the generation of steam it will be understood that it is taken by way of example only and is not to be considered as limiting.

In the drawings:

Fig. 2 is a sectional elevation of a transducer for converting fluid pressure signals into electrical signals.

Figure 4:
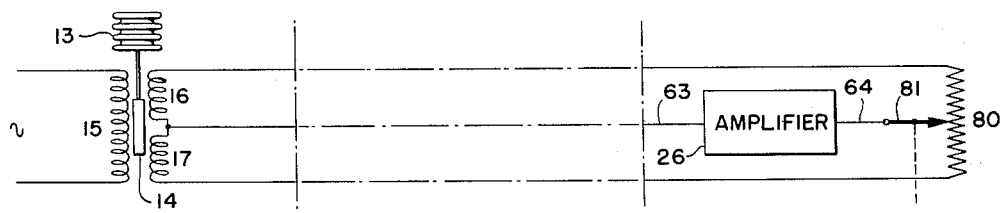
Figure 5:
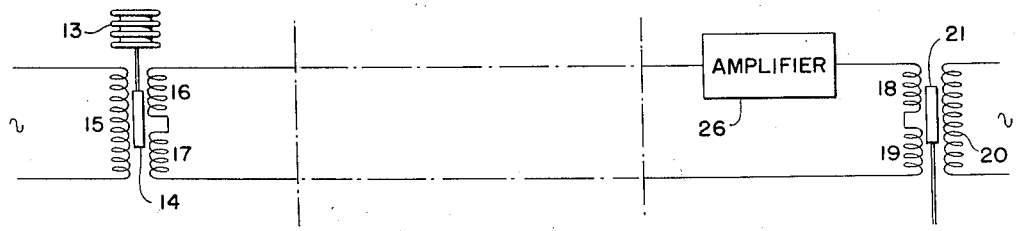

Figs. 4 and 5 schematically illustrate further telemetering arrangements which may be used between the fluid pressure signal transmitter and the electrical receiver.

Figure 1:
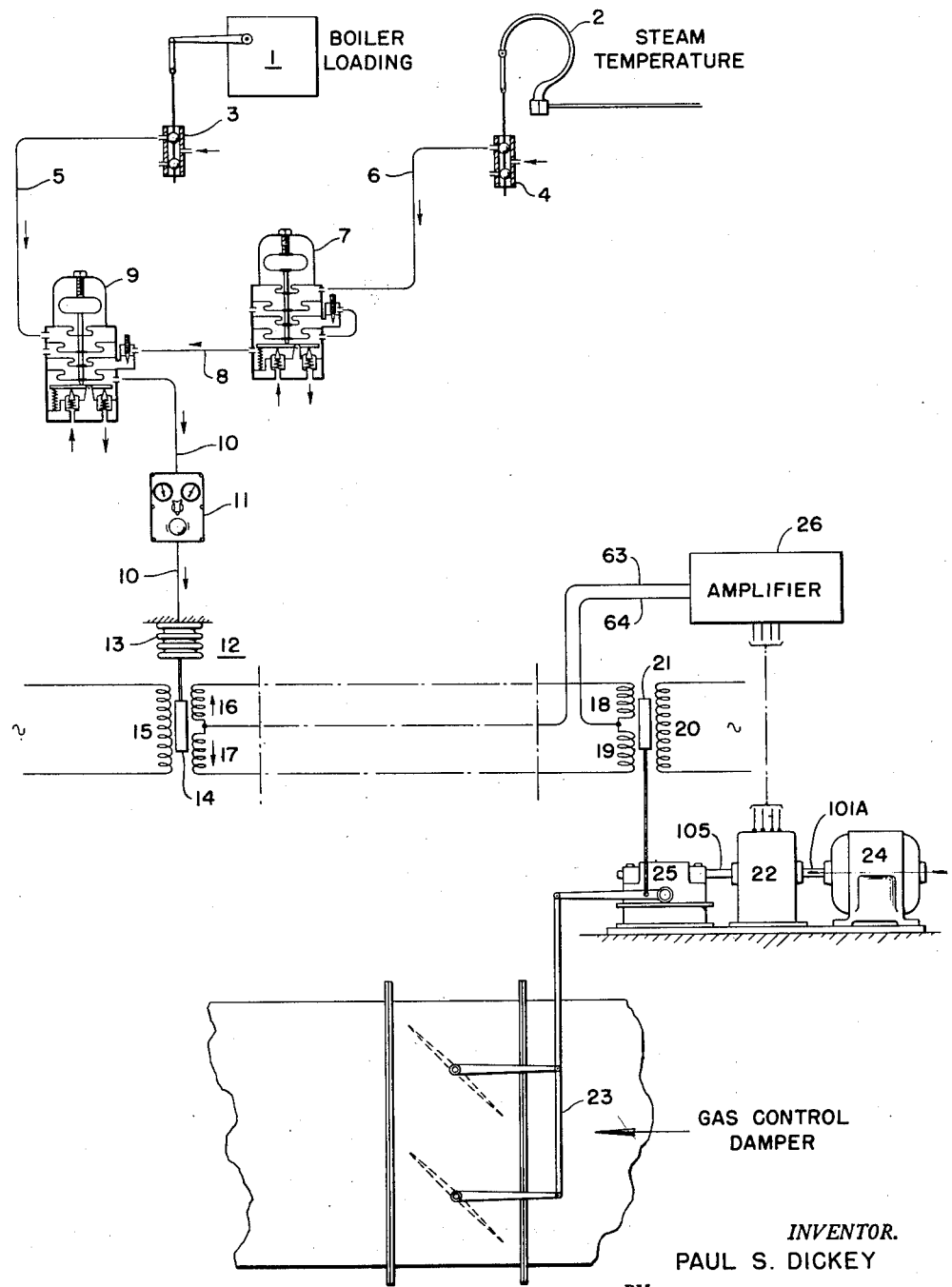
Fig. 1 illustrates a preferred embodiment of my invention wherein a damper is remotely positioned in accordance with the dictates of a plurality of variable factors of vapor generator operation.

Fig. 6 is a sectional elevation of one form of reversible magnetic fluid clutch such as is included in the system of Fig. 1.

Fig. 7 is a sectional view of Fig. 6 taken along the line 7—7 in the direction of the arrows.

Fig. 8 illustrates a further embodiment of the invention in connection with a nonreversible magnetic fluid clutch.

Fig. 9 is a sectional view of the magnetic clutch of Fig. 8.

Referring now to Fig. 1 I show therein in somewhat schematic fashion an illustrative embodiment of my invention as applied to the control of the temperature of vapor produced by a conventional form of vapor generator. In illustration of a system for reducing a plurality of variables to a single signal for translation, I have shown measuring or detecting devices 1 and 2 which are respectively sensitive to the loading of the vapor generator in the form of steam flow therefrom and temperature of the steam respectively. Each of these devices individually positions pneumatic pilot valves 3 and 4, which may take the form disclosed in the patent to Clarence Johnson 2,054,464 to establish within conduits 5 and 6 respectively air pressures representative of the value of the variables to which the devices 1 and 2 are sensitive. Pressure within conduit 6 is effective upon a standardizing relay 7 which establishes an air pressure within conduit 8 which will build up or decay upon departure of steam temperature in one direction or the other from desired value.

Fluid pressures within the conduits 5 and 8 are effective upon an averaging relay 9 producing a final fluid pressure within a conduit 10 representative of a control effect in desired relation to boiler loading and steam temperature. The relays 7 and 9 may be of the type disclosed and claimed in the Gorrie Patent Re. 21,804. Interposed in the conduit 10 is a manual-automatic selector switch 11. When in the "manual" position the switch 11 may be used to remotely manually position the power operator controlling the variable.

I provide a transducer 12 for changing the fluid pressure signal in the conduit 10 into an electrical value which may then be telemetered to a remote location. Transducer 12 consists, in the present embodiment, of a bellows 13 to which the conduit 10 is connected. The movable wall of bellows 13 is arranged to position a core 14 relative to transformer windings 15, 16 and 17. The assembly comprises a movable core transformer in which the primary 15 is continuously energized and is variably coupled through the agency of the core 14 to the secondary windings 16, 17.

At the remote receiving location a similar movable core transformer includes the energized primary 20 and a pair of secondary windings 18, 19 which are magnetically coupled to the primary by means of movable magnetic core 21.

The secondary windings 16, 17, 18 and 19 are connected in series loop. The joining point of the windings 16, 17 and of the windings 18, 19 are connected by a conductor 63, 64 in which is inserted an amplifier 26. As illustrated, a considerable distance may be had between the location of the transducer 12 and of the receiving-controlling assembly.

When the telemetering system is in balance no voltage exists in the conductors 63, 64 and the output of the amplifier 26 is at a predetermined norm which may be zero.

If the bellows 13 moves the core 14 from its previous position or, if the core 21 is moved from its previous position, the voltages induced in the secondary windings 16, 17 or 18, 19 is changed and the network becomes unbalanced to the end that a voltage appears across the conductors 63, 64 whose direction and magnitude is representative of the direction and extent of unbalance between the transmitter and the receiver.

In accordance with the phase and magnitude of the voltage signal received by it, the amplifier 26 gives direction and extent of movement to damper mechanism 23 through control of the constant speed unidirectional motor 24 and the magnetic fluid clutch 22 joining the motor to a gear reduction 25. It is thus seen that the direction and extent of change of the fluid pressure within conduit 10 is utilized to alter the position of damper mechanism 23 in a direction and to an extent that will alter the gas control damper to correct the value of steam temperature upon departure thereof from predetermined or desired value.

As the damper mechanism 23 is moved so also is the core 21 from the gear box 25. Movement of the core 21 is in a direction to counteract the effect of a movement of core 14 to bring the telemetering network back to balance. In other words, if core 14 is moved downwardly then the unbalance of the telemetering network results in an upward movement of core 21 to an extent just necessary to return the network to balance and to stop movement of the core 21 and damper mechanism 23.

In Fig. 2 I have illustrated in sectional elevation the transducer 12 having a basic housing 50 preferably in the form of a cylinder with end caps 51 and 52. Arranged within housing 50 and depending from the upper cap 51 is shown the bellows 13 distended from within by a calibrating spring 54 which is adjustable through screw member 55 extending to the top of cap 51. The spring member 54 bears on a reinforcing member 56 secured to the bottom of the bellows 13 and core member 14 depends from the entire assembly. It is seen that the core member 14 is suspended in alignment with transformer primary 15 and secondary windings 16, 17. Fluid pressure is introduced from the conduit 10 into the casing 50 through an opening 58. It is well understood that such fluid pressure may be applied to the inside of bellows 13 as shown in Fig. 1 or to the exterior of bellows 13 as shown in Fig. 2 depending on spring loading and direction of movement of the associated parts.

Figure 3:
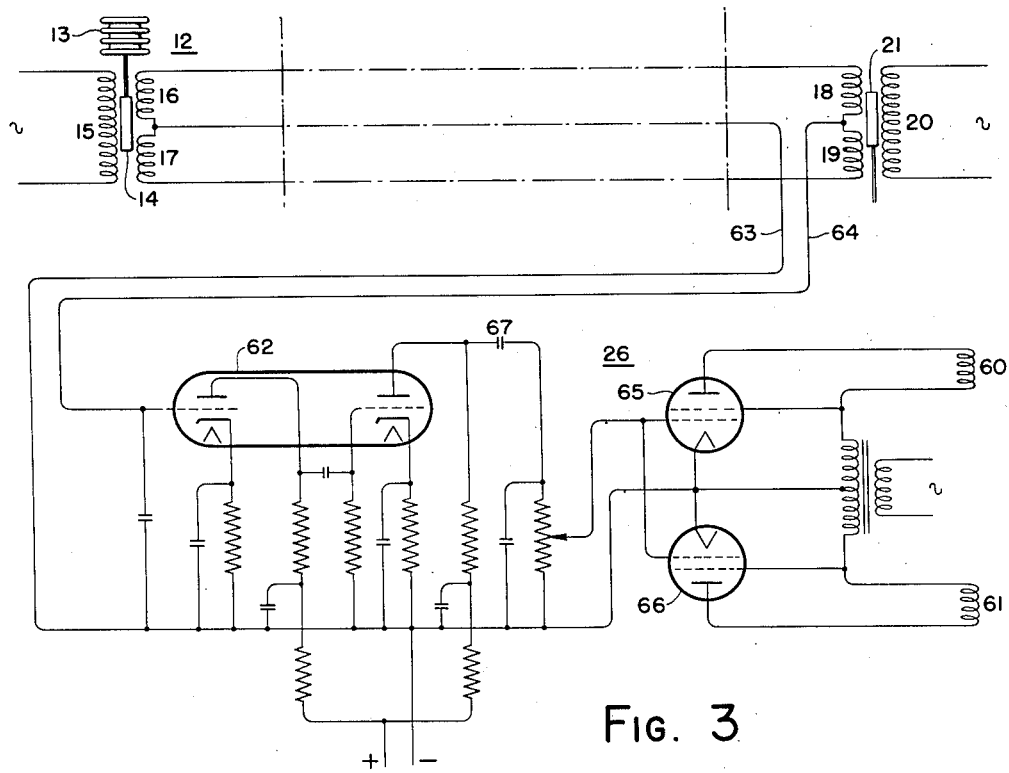
Fig. 3 is a more detailed wiring diagram of a portion of the system of Fig. 1.

In Fig. 3 I have shown in somewhat greater detail the telemetering and amplifying circuits for control of the windings 60, 61 of the magnetic fluid clutch 22. In this arrangement the clutch windings 60 and 61 are selectively excited by an unbalance of the telemetering circuit as amplified through the amplifier 26. Amplifier 26 is responsive to any voltage across conductors 63, 64 in turn controlling tubes 65 and 66 whose output circuits are individually included in the circuits of the windings 60 and 61.

If the winding 60 is energized, the magnetic fluid coupling output shaft will rotate in one direction while if the winding 61 is energized, the output shaft will rotate in opposite direction. If the energization of windings 60, 61 is equal no rotation of the coupling output shaft occurs. Rotation of said shaft occurs in direction and at a speed determined by the difference in energization of windings 60, 61.

The grids of the double triode 62 may be biased so that the triodes are not conducting or that they are conducting a predetermined amount. Direct current normally flowing through the output circuit has no effect upon the potential impressed upon the grids of tubes 65 and 66, by virtue of a condenser 67. Upon passage of alternating current through conductors 63, 64, however, the current in the output of the double triode 62 becomes pulsating in character which will pass through the condenser 67 and will render either the tube 65 or 66 conducting selectively in accordance with the phase of the potential across 63, 64.

The tubes 65, 66 may normally be maintained nonconducting. To provide a high degree of sensitivity in some cases it may be preferable to maintain these tubes normally somewhat conducting in which case the pulsating current originating due to unbalance of the system will selectively render one or the other of the tubes more conducting.

In general the windings 60, 61 may normally be slightly energized or may be without energization. If the telemetering system is in balance and no potential shows across conductors 63, 64 then the energization of the windings 60, 61 is preferably equal and may be at zero value. An unbalance in the telemetering network, produced by a movement of the core 14, shows as a potential across conductors 63, 64 of a phase and magnitude depending upon the direction and amount of unbalance. The result, through the amplifier section 26, is an unbalance in energization of the windings 60, 61 in amount and direction determined by the direction and amount of movement of core 14. Thus, whenever the value or relation in values of boiler loading and steam temperature cause a variation in fluid pressure in the conduit 10, there appears an unbalance signal across conductors 63, 64 resulting in an unbalance in energization of the windings 60, 61 for positioning of the damper mechanism 23 and the core 21. The damper 23 is positioned in direction and extent to return steam temperature to desired value while the core 21 is positioned in proper direction and extent to rebalance the telemetering network and wipe out the potential existing across 63, 64.

Fig. 4 shows another telemetering arrangement wherein the receiving end includes a balancing potentiometer 80 and slide contact 81, the latter positioned by and with the damper mechanism 23. Fig. 5 illustrates a further arrangement requiring only two wires between the transmitter and receiver.

Fig. 6 shows a somewhat diagrammatic sectional view of the magnetic fluid coupling device 22 of Fig. 1. Control of the device 22 regulates the application of power from the constant speed unidirectional motor 24 through the gear box 25 to position the damper 23 and the balancing core 21.

Referring now specifically to Figs. 6 and 7 it will be seen that the windings 60, 61 are retained circumferentially within a steel casing 100 by brass retaining rings 102. The cavity formed by the housing 100 is filled with a magnetic fluid 101 which may take the form of a light oil having a suspension therein of small magnetizable particles which will form chain ties with one another upon being subjected to a field of magnetic flux.

A portion of the steel casing 100 projects down between the two windings to maintain a separation as well as to provide a portion of the flux path from each coil around the brass retaining rings and through the magnetic fluid mixture. The magnetic fluid 101 is retained within the cavity of casing 100 by bearing bushings 103, 104 and 111.

Fastened to a shaft 105 is a magnetizable disc 106 centered to the coil 61. With such arrangement, when coil 61 is energized, it may generate a flux which will tend to bind the disc 106 to the casing 100 by means of the chain magnetic ties of the particles. The housing 100 has an extension (to the right on the drawing) 101A forming the portion suitably coupled to the motor 24 and driven thereby. Thus the casing 100 and its extension 101A are driven in one direction at uniform speed by the motor 24. Extension 101A may carry the necessary slip rings 100B for energizing windings 60, 61.

Carried by the shaft 105 is a gear 107 forming the sun of a system having planets 108 supported by a nonrotatable member 108A.

Thus, if the winding 61 is energized, the disc 106 and output shaft 105 with its gear 107 will be rotated in the same direction as the housing 100 but the member 110 and its magnetizable disc 110A will rotate in the opposite direction because of the planet gears 108. Bearing member 111 allows the rotation of housing 100 and member 110 in opposite direction.

If coil 60, rather than coil 61, is energized a coupling between casing 100 and disc 110A becomes positive in accordance with the degree of energization by means of the flux of coil 60 tending to solidify the fluid 101 between the housing sides 100 and the disc 110A. With winding 60 energized then the housing 100, disc 110A and sleeve member 110 rotate in one direction while the gear 107 and output shaft 105 as well as disc 106 rotate in the opposite direction through the agency of the planets 108.

Thus it will be seen that by predominantly energizing either winding 60 or winding 61 the output shaft 105 is rotated in one direction or the other and at a speed determined by the degree of energization of the winding. The circuit arrangement is preferably such that the energization of one winding predominates over that of the other winding depending upon the unbalance of the telemetering circuit and the direction and thereby the phase and magnitude of the potential across the conductors 63, 64.

Referring back to Fig. 1 it will be seen that the output shaft 105 joins a gear reduction box 25 connected to position the damper 23 and the balancing core 21 in one direction or the other and at a speed and to a total degree of travel all depending upon the unbalance of the network as represented by the potential phase and magnitude of the potential across conductors 63, 64.

In Fig. 8 there is schematically illustrated a further embodiment of my invention utilizing as a transducing device an arrangement disclosed and claimed in the copending application of Howard T. Hoffman, S. N. 120,311, filed October 8, 1949, now Patent 2,598,258. By this arrangement fluid pressure signals in the conduit 10 are transduced into electrical signals in the conductors 125, 126 for control of a magnetic fluid clutch 124. The fluid clutch of this figure is not of the reversible type discussed in connection with Fig. 1 but is of a type giving a variable output in a single direction of rotation.

In greater detail, selector valve 11 may pass a fluid pressure signal through conduit 10 into bellows 13 to act upon a force balancing lever 120 tending to position the same in clockwise direction for moving the contact arm 121 over a resistance 122. By its movement contactor 121 tends to increase or decrease the resistance 122 in D.-C. circuit of which it is a part and consequently to vary the current passed through the winding of the magnetic fluid clutch 123 and simultaneously the second circuit formed by the winding of a fluid clutch 124 by way of conductors 125, 126. With the variation in electric current in the winding of fluid clutch 124 established in accordance with fluid pressure in conduit 10 the output of constant speed source 127 is varied in its effect upon shaft 128. The arrangement of the transducer is such that an increase in fluid pressure within bellows 13 tends to move the arm 120 in clockwise direction raising the arm 121 along the resistance 122 allowing more current to flow through the circuit and the windings of the clutches 123 and 124. With an increase of current through the winding of clutch 123 the coupling action is increased in strength so that it tends to rotate lever arm 120 in a counterclockwise direction opposing the action of bellows 13 and tending to move the contact 121 downwardly over the resistance 122 until a balance of forces is reached on the beam 120.

It will be understood that the fluid clutches 123 and 124 are similar although they may be different as to size and power transmittal rating. The clutch 123 may normally be driven by a small synchronous motor at uniform speed in a single direction and will impose a torque upon the force beam 120 in dependence upon the degree of freezing of the magnetic fluid which in turn depends upon the current imposed upon the winding of the clutch assembly.

Fig. 9 shows a cross-section of the magnetic fluid coupling 124 although the arrangement is similar to that of 123. Here the input shaft 129 is driven by a constant speed motor 127 continually rotating a disc 134 which is positioned within a housing 133 and surrounded by a magnetic fluid 135. The housing 133 contains the winding 132 which may be energized through the conductors 125, 126 and the necessary slip rings. An output shaft 128 is fastened to and rotates with the housing 133. The assembly and operation is such that the shaft 129 and disc 134 normally rotate in given direction at a uniform speed. Depending upon the degree of energization of the winding 132, the housing 133 and output shaft 128 rotate in the same direction as the shaft 129 but at a speed dependent upon the degree of winding energization.

As diagrammatically shown in Fig. 8 the shaft 129 and the shaft 128 each drives through proper gearing to a differential 131 from which a resultant positioning is applied to move the damper 23. Gearing may be so arranged that the input to differential 131 from the shaft 129 is at the uniform speed. The input to differential 131 from shaft 128 will vary above and below the speed transmitted from shaft 129 to the end that under a normal condition there will be no output movement of the differential 131. An increase or decrease in the energization of the winding 132, from a norm value, will cause a positioning of dampers 23 in one direction or the other and at a speed dependent upon the magnitude of the change in energization.

In general it will be observed that the arrangement of Fig. 1 provides a tie-back, through the agency of core 21, whereby the position of the dampers 23 may be said to be geared to the position of the core 14 and thereby to the value of fluid pressure signal within the conduit 10. Thus a "geared control" is provided. On the other hand, the arrangement of Fig. 8 is in the nature of a "floating control" whereby, for every change in fluid pressure signal within the conduit 10, the dampers 23 are moved in proper corrective direction until the change in gas flow controlled by the dampers is felt by the actual steam temperature value and this in turn varies the fluid pressure in conduit 10. Thus, for every change in value of fluid pressure within the conduit 10, there may be a movement of the dampers 23 in proper direction and continuously until the overall condition is corrected.

While I have chosen to illustrate and describe certain preferred embodiments of my invention particularly in connection with the control of steam temperature of a vapor generator, it will be understood that the invention is not limited thereto but may be applicable to many other problems in the control of variables.

What I claim as my invention and desire to secure by Letters Patent of the United States, is:

1. In a system of control for the magnitude of a condition, including in combination, means for detecting a variable of the condition, means for producing a fluid pressure representative of the value of said variable, means for producing an electric value proportional to said fluid pressure, a magnetic fluid clutch sensitive to said electric value, a uni-directional source of constant power operatively connected to the input shaft of said magnetic fluid clutch, means positioned by the output shaft of said magnetic fluid clutch which controls the application of an agent affecting the condition, and means for reducing the electric effect to which the magnetic fluid clutch is sensitive to maintain the agent-applying means in the new position determined by the fluid pressure.

2. A system of control for the application of an agent, including in combination, means for determining the value of variables of a condition dependent upon the agent, means for expressing the value of the variables as fluid pressures, means for expressing the relation between said fluid pressures as a resultant fluid pressure, means for expressing said resultant fluid pressure as an electric value, a magnetic fluid coupling under control of said electric value, a source of constant power input to said magnetic fluid coupling, and means positioned in accordance with the coupling output for control of the agent and simultaneous reduction of the electric value so that the agent will be applied to the condition at a rate determined by the magnitude of the resultant fluid pressure.

3. A system of control for the application of an agent, including in combination, means for determining the value of variables of a condition affected by the agent, means for expressing the value of the variables as fluid pressures, means for expressing the relation between said fluid pressures as a resultant fluid pressure, means for expressing said resultant fluid pressure as an electric value, means for comparing said electric value to a reference electric value indicative of the instantaneous rate of supply of the agent, means sensitive to a difference between the electric values, a magnetic fluid coupling under control of said electric sensitive means, a source of constant power directed to the magnetic fluid coupling input, means positioned in accordance with the magnetic fluid coupling output for control of the agent, and means for reducing the difference between the electric values as the agent-controlling means assumes a position in accordance with the difference between the electric values.

4. A system of control for the supply of an agent upon which a condition is dependent including in combination, means for establishing fluid pressures in accordance with the value of variables of said condition, means for establishing a resultant fluid pressure in accordance with the relation between the fluid pressures, an expansible chamber responsive to said resultant fluid pressure, a first movable core transformer responsive to the movement of said chamber so that the voltage induced in the secondary windings corresponds to the chamber movement, a second movable core transformer whose secondary windings form a network with the secondary windings of said first movable core transformer, a phase sensitive electronic amplifier network responsive to the difference in the induced voltages of the network of secondary windings, electron discharge tubes under control of said amplifier network, windings of a reversible magnetic fluid clutch in circuit with each of said tubes, a constant speed motor rotating the input shaft of said clutch in one direction, an output shaft from said clutch which rotates in the direction determined by the clutch winding energized, means for control of the agent upon which the condition depends operatively connected to said coupling output shaft, and linkage for operatively connecting the core of said second movable core transformer to the output shaft for restoration of the voltage balance of the network of secondary windings.

5. A system of control for apparatus applying an agent to a condition including in combination, means for transducing into an electrical voltage a fluid pressure whose magnitude varies in accordance with the demand made upon the condition, means for applying said voltage on a remote station, means for producing a reference voltage at said remote station, a phase-sensitive device for comparing the transduced voltage with the reference voltage, and a reversible magnetic fluid clutch having separate operating coils under the control of said phase-sensitive device, means connecting the clutch output for controlling the apparatus applying the agent to the condition and means actuated by said clutch output simultaneously reducing the difference between the transduced and reference voltages.

6. A control system including in combination, means establishing a fluid pressure signal continuously representative of the value of a variable, an electric telemetering balanceable network, a transducer receiving the fluid pressure signal and having components in said network, a change in fluid pressure causing an unbalance of the network, rebalancing means also in the network, electronic circuit means sensitive to network unbalance, a unidirectional electric power means, and a magnetic fluid coupling having an input shaft driven by the power means and having an output shaft, said rebalancing means positioned by the output shaft and said magnetic fluid coupling controlled by the electronic circuit means.

7. A control system for positioning a damper or the like for regulating the value of a variable, including in combination; a continuously running unidirectional electric power motor for positioning a damper or the like; means sensitive to a variable and adapted to establish a fluid pressure signal as the primary dictator for the power motor; a balanceable telemetering network; a component of the network sensitive to said fluid pressure signal and arranged upon change in value of the signal to cause an unbalance of the network; electronic circuit means controlled by an unbalance of the network; a magnetic fluid coupling device coupling the motor to the damper; said device controlled by the electronic circuit means; and a rebalancing component of the network also positioned by the magnetic fluid coupling.

8. Apparatus for controlling a variable condition including in combination, sensitive means adapted to establish a force signal continuously representative of a variable, means transducing said force signal into an electrical signal, a unidirectional continuously running power means, means to exert a controlling influence on said variable condition, a magnetic fluid coupling interposed between the last two mentioned means, a second unidirectional continuously running power means, and a magnetic fluid coupling opposing said last mentioned power means to said force signal, said couplings being simultaneously under the control of said electric signal.

9. In a system of the type described for exerting a continuous controlling influence on a variable condition, in combination, means responsive to the said condition for establishing a fluid pressure signal continuously representative of the value of said condition, a source of unidirectional continuously running power, a magnetic fluid clutch opposing said power to said signal, a second source of unidirectional continuously running power, means arranged to control the value of said condition, a magnetic fluid clutch adapted to connect said second source of power to said last mentioned means, a source of electric energy connected to actuate said clutches, and means actuated as a resultant of the opposed signal and power to regulate said electric energy as applied to said clutches.

10. In a system of the type described for exerting a continuous controlling influence on a variable condition, in combination, means responsive to the said condition for establishing a fluid pressure signal continuously representative of the value of said condition, a source of unidirectional continuously running power, a magnetic fluid clutch opposing said power to said signal, a second source of unidirectional continuously running power, means arranged to control the value of said condition, a magnetic fluid clutch driven by said second source of power, a differential device having two inputs and one output, the latter connected to said condition value control means, the opposite sides of said clutch being connected to said inputs, a source of electric energy connected to actuate said clutches, a rheostat in circuit between said source and said clutches, and means actuated by the opposed power and signal to adjust said rheostat.

11. A control system including in combination, means establishing a fluid pressure signal continuously representative of the value of a variable, a transducer of the fluid pressure signal into an electric signal, an electric motor driven continuously in one direction, means for directionally controlling the variable value under direction of the electric motor, a reversible magnetic fluid coupling under control of the electric signal for positioning the directional control means for the variable in either of two directions by the electric motor, and means for progressively rendering the electric signal ineffective as the directional control means assumes a new position.

12. The combination of claim 11, including a mechanical differential having an output and two inputs, drive means connecting the differential output to the directional control means, and drive means connecting the individual outputs of the motor and the magnetic coupling to each of the inputs of the differential.

13. A control system including in combination, means establishing fluid pressure signals continuously representative of the values of a variable, a transducer receiving the fluid pressure signals and producing electrical values representative thereof, means regulating a variable, an electric power motor for said regulating means, said motor operated continuously in one direction, a magnetic fluid coupling joining the motor to the regulating means, said magnetic fluid coupling including two magnetic clutch means and a reversing gear associated with one of them, and a separate winding controlling each clutch, said electrical value being in control of the windings differentially.

PAUL S. DICKEY.

REFERENCES CITED

The following references are of record in the file of this patent:

UNITED STATES PATENTS

| Number | Name | Date |
|---|---|---|
| 1,975,875 | Spohr | Oct. 9, 1934 |
| 2,028,571 | Smulski | Jan. 21, 1936 |
| 2,193,184 | Weaver | Mar. 12, 1940 |
| 2,406,221 | Hornfeck | Aug. 20, 1946 |
| 2,420,539 | Hornfeck | May 13, 1947 |

OTHER REFERENCES

The Magnetic Fluid Clutch, Oct. 7, 1948, by Jacob Rabinow (eight pages).